United States Patent [19]
Ortiz

[11] Patent Number: 5,717,146
[45] Date of Patent: Feb. 10, 1998

[54] DEVICE AND METHOD FOR MEASURING MULTI-PHASE FLUID FLOW IN A CONDUIT HAVING AN ABRUPT GRADUAL BEND

[75] Inventor: Marcos German Ortiz, Idaho Falls, Id.

[73] Assignee: Lockheed Martin Idaho Technologies Company, Idaho Falls, Id.

[21] Appl. No.: 720,849

[22] Filed: Oct. 3, 1996

Related U.S. Application Data

[63] Continuation-in-part of PCT/US96/01521 Feb. 2, 1996, which is a continuation-in-part of Ser. No. 383,343, Feb. 3, 1995, Pat. No. 5,641,915.

[51] Int. Cl.$^6$ ............................................. G01F 1/34
[52] U.S. Cl. ............................... 073/861.42; 73/861.72
[58] Field of Search ......................... 73/861.42, 861.69, 73/861.72, 30.01, 30.02, 32, 430

[56] References Cited

U.S. PATENT DOCUMENTS

| | | |
|---|---|---|
| 970,965 | 9/1910 | Speed . |
| 1,181,490 | 5/1916 | Levin . |
| 1,905,558 | 4/1933 | Foote . |
| 1,963,011 | 6/1934 | Albershim et al. . |
| 3,067,611 | 12/1962 | Bowers et al. . |
| 3,777,549 | 12/1973 | Lodge . |
| 3,855,845 | 12/1974 | Homolka ........................ 73/30.02 |
| 4,074,573 | 2/1978 | Nordhofen . |
| 4,144,754 | 3/1979 | Pitts, Jr. et al. ................ 73/861.69 |
| 4,277,832 | 7/1981 | Wong . |
| 4,581,934 | 4/1986 | Holzl ................................ 73/438 |
| 4,625,548 | 12/1986 | Charter ....................... 73/438 X |
| 4,625,553 | 12/1986 | Charter ............................ 73/438 |
| 4,856,344 | 8/1989 | Hunt . |
| 5,323,661 | 6/1994 | Cheng ..................... 73/861.42 X |
| 5,337,609 | 8/1994 | McFarland . |
| 5,400,657 | 3/1995 | Kolpak et al. . |

FOREIGN PATENT DOCUMENTS

| | | |
|---|---|---|
| 2565344 | 12/1985 | France . |
| 2828129 | 3/1980 | Germany ..................... 73/861.69 |
| 02-38817 | 2/1990 | Japan . |
| 432416 | 7/1935 | United Kingdom . |

OTHER PUBLICATIONS

McGraw-Hill, McGraw-Hill Encyclopedia of Science & Technology, 6th Edition, Published 1987, By McGraw-Hill Book Co. (NY), P. 162, See "See Pipe Elbow"& Fig. 7.

E.G. Hauptmann, "Take a Second Look At Elbow Meters For Flow Monitoring"Instruments and Control Systems, October 1978, PP. 47–50. See Entire Document.

Su A, 765,696 (Tyurikov et al.) 30 Sep. 1992, See Abstract and the Fig.

JP, A, 64–732221 (Onishi) 17 Mar. 1989, See the Abstract and Fig. 1.

*Primary Examiner*—George M. Dombroske
*Assistant Examiner*—Paul D. Amrozowicz
*Attorney, Agent, or Firm*—Thorpe North & Western

[57] ABSTRACT

A system for measuring fluid flow in a conduit having an abrupt bend. The system includes pressure transducers, one disposed in the conduit at the inside of the bend and one or more disposed in the conduit at the outside of the bend but spaced a distance therefrom. The pressure transducers measure the pressure of fluid in the conduit at the locations of the pressure transducers and this information is used by a computational device to calculate fluid flow rate in the conduit. For multi-phase fluid, the density of the fluid is measured by another pair of pressure transducers, one of which is located in the conduit elevationally above the other. The computation device then uses the density measurement along with the fluid pressure measurements, to calculate fluid flow.

12 Claims, 1 Drawing Sheet

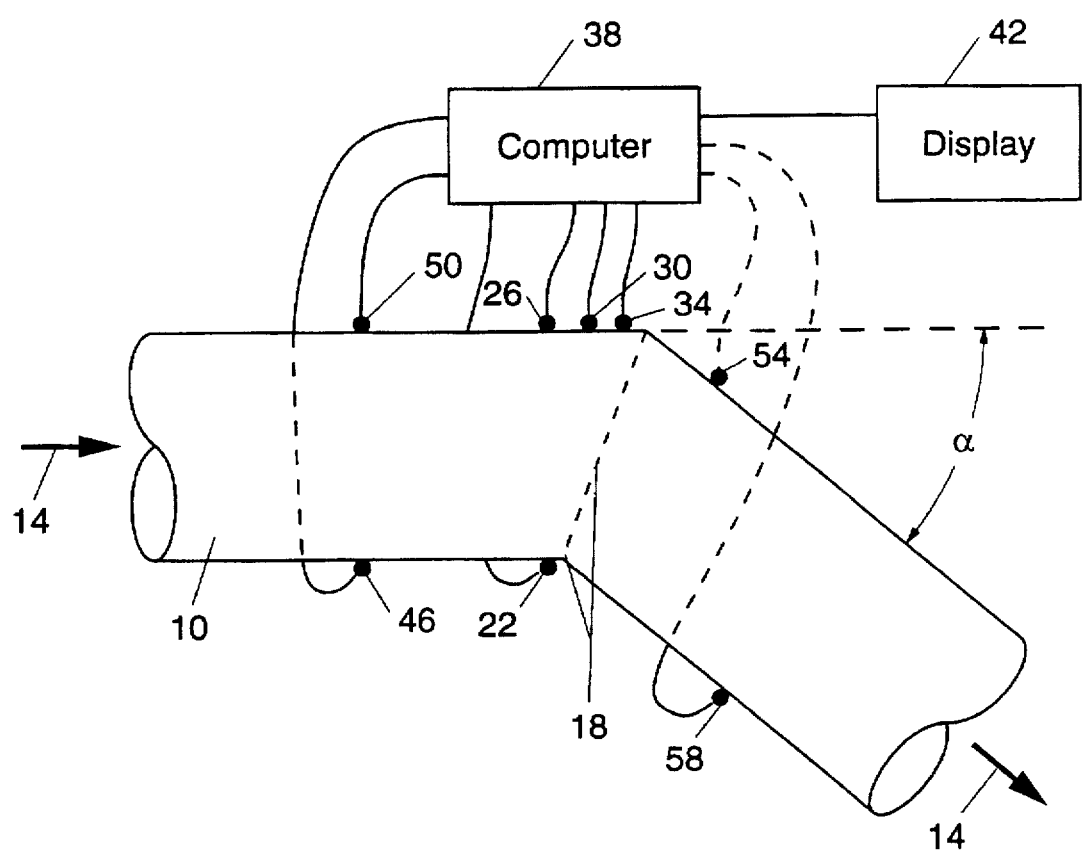

DEVICE AND METHOD FOR MEASURING MULTI-PHASE FLUID FLOW IN A CONDUIT HAVING AN ABRUPT GRADUAL BEND

BACKGROUND

This is a continuation-in-part of PCT/US96/01521 filed Feb. 2, 1996, which is a continuation-in-part of application Ser. No. 08/383,343, filed Feb. 3, 1995 U.S. Pat. No. 5,641,915.

CONTRACTUAL ORIGIN OF THE INVENTION

The United States Government has rights in this invention disclosed under Contract No. DE-AC07-76ID01570 between the United States Department of Energy and EG&G Idaho, Inc., now Contract No. DE-AC07-94ID13223 with Lockheed Martin Idaho Technologies Company.

1. Field of the Invention

This invention relates to apparatus and methods for measuring multi-phase (including single phase) mass flow in a conduit, such as water flow in an irrigation pipe, having an abrupt bend, and relates more specifically to such apparatus and methods which are substantially non-obstructing.

2. Background Art

The desire to measure flow in a conduit has a long history dating back to the time of Caesar and the measurement of the flow of water to householders. More recent developments have led to a variety of applications for devices measuring flow in a conduit.

The need to measure fluid flow in a conduit may arise from a desire to control, track, or adjust the amount of fluid being delivered through the conduit. Naturally, measuring the flow in a conduit is useful in a number of applications. One such application is measuring the flow of water through a sprinkler pipe, particularly in agricultural irrigation applications. This is desirable for several reasons, including the desire to track the amount of water delivered to a given tract of land so that adequate irrigation for the crop being grown is provided. Additionally, in regions where irrigation is needed for growing crops, water is usually a precious commodity and, therefore, the efficient use of water is highly desirable. For such reasons, irrigation systems require the ability to monitor the delivery of water and measure flow rate.

A number of devices for measuring flow rate exist for various applications. The size of the conduit being used, accuracy, cost, and other factors all play a role in determining what type of measuring device will be used for a specific application. One of the most widely used type of device is the so-called differential pressure producing flowmeter. The principle on which this type of device operates is that when the flow in a conduit is contracted (or squeezed), kinetic energy increases at the expense of available potential energy. A feature, therefore, in existing devices for measuring flow in this fashion is to contract the flow through the conduit. Typical systems for reducing the flow include installing a section of pipe which tapers to a significantly smaller diameter, inserting a blockage in the conduit, or creating some other obstruction.

As will be appreciated, contracting the flow of water through a sprinkler pipe is undesirable for a number of reasons. For example, irrigation water often contains debris which can become lodged in a small diameter pipe or caught on an obstruction. This can result in plugging of the pipe, requiring time, energy, and expense to unplug or otherwise repair it. In addition, serious incidents of plugging or damage may jeopardize crops which go unwatered during the time spent unplugging or repairing the pipe. This is particularly true during critical periods in a crop's growing cycle.

An additional problem with differential pressure producing devices currently available is that there is often significant retrofitting required to incorporate them into the system where flow is being measured. For example, in the case of devices which use a gradual reduction in the diameter of the conduit, a relatively long section of conduit must be removed and replaced with a tapering conduit section.

Yet another problem with current devices for measuring flow in a conduit is that variations in temperature and humidity can adversely affect their operability and accuracy. This is particularly true if the variations in temperature or humidity are pronounced. Unfortunately, these are often exactly the types of conditions encountered in agricultural irrigation applications in arid regions. Arid regions can experience wide variations in temperature with hot days and cold nights. In addition, the irrigation systems themselves may cause variations in humidity.

Another prior art approach to measuring flow rate is the so-called elbow flow meter in which a curved section of pipe (the elbow) in the fluid delivery system is fitted with pressure sensors to measure pressure differential in the elbow. In order to measure the flow accurately, the sensors must be precisely placed in both the outer and inner circumferential walls of the elbow, in the same radial plane, and then must be calibrated. (See J. W. Murdock al., "Performance Characteristics of Elbow Flow Meters," Trans. of the ASME, September 1964.)

It would be an advantage in the field of flow measurement to provide a differential pressure measuring device which would be relatively simple to install, substantially accurate through differing temperature and humidity ranges, and substantially non-obstructing such that the likelihood of plugging of the conduit in the area of the device is lessened.

BRIEF SUMMARY AND OBJECTS OF THE INVENTION

The present invention is an apparatus and method for measuring the flow of fluid through a conduit having an abrupt bend, which is either specifically installed in the system to do the measurements or is an original feature of the conduit system. The measurement apparatus includes pressure sensors for detecting pressure differentials in the fluid flowing through the bend and a device for calculating the flow rate through the conduit from the pressure measurements.

In a preferred embodiment, one pressure transducer is disposed in the conduit at the inner portion of the bend, and one or more pressure transducers are disposed in the conduit generally opposite the first-mentioned transducer, either just before or just after the bend. Use of two or more pressure transducers on the outside of the bend allows for averaging out noise or turbulence produced by the bend, to thereby give a more accurate measurement. The pressure measurements made by the pressure transducers, along with fixed parameters of the conduit, are used in calculating flow rate through the conduit.

For multi-phase fluid flow through a conduit (flow of two or more materials of differing density), an average density measurement is taken by measuring the vertical pressure differential of the fluid between two pressure transducers disposed in the conduit, with one transducer at a higher elevation than the other but generally in the same vertical slice of the conduit, positioned either before or after the bend. This pressure differential measurement may then be used to calculate fluid density which, in turn, is used to calculate fluid flow rate.

In accordance with one aspect of the invention, the pressure transducers (or fluid pressure taps) are disposed generally at the inside surface of the conduit so as to be non-intrusive into the fluid flow. In this manner, the likelihood of debris in the fluid getting caught on the pressure transducers or taps is minimized if not eliminated.

Accordingly, it is a primary object of the present invention to provide apparatus for measuring fluid flow in a conduit having an abrupt bend, where such apparatus is easy to install and generally non-obstructing.

Another object of the invention is to provide a rugged apparatus which is substantially immune to fluctuations in temperature and humidity, and to noise and turbulence.

These and other objects of the invention will become apparent from the following description and appended claims.

BRIEF DESCRIPTION OF THE DRAWING

In order to more fully understand the manner in which the above-recited and other advantages and objects of the present invention are obtained, a more particular description of the invention briefly described above will be rendered by reference to the presently understood best mode for making and using the same, as illustrated in the appended drawing. Understanding that this drawing depicts only typical embodiments of the invention and are, therefore, not to be considered as limiting of its scope, the invention will be described with additional specificity and detail through the use of the accompanying drawing which shows a side, elevational view of apparatus for measuring fluid flow in a conduit having an abrupt bend, in accordance with the principles of the present invention.

DETAILED DESCRIPTION OF THE INVENTION

Referring to the drawing, there is shown a fragmented, side, elevational view of a conduit 10 for carrying a fluid in the direction indicated by arrows 14, and which has an abrupt bend 18. Here, the bend in the conduit 10 is a downward bend, but the present invention is suitable for measuring fluid flow in a conduit with an abrupt bend directed sideways, upwardly, or in any direction. The fluid flow measurement made by the present invention utilizes the pressure differential in the fluid created by the fluid flowing around the bend 18.

The apparatus for measuring flow in the conduit 10 includes a pressure transducer 22 (or a fluid pressure tap) disposed in the wall of the conduit 10 to contact the fluid and located near the location of the bend 18, upstream thereof, or preferably right at the bend. Also included are three pressure transducers 26, 30 and 34 (or fluid pressure taps) disposed in the wall of the conduit 10 and located generally diagonally opposite transducer 22 and spaced in a line upstream (or downstream) but near the bend 18. Preferably, the transducers (or taps) 26, 30 and 34 are located within a distance of the bend 18 of about one-third of the diameter of the conduit 10, or less. An exemplary transducer which could be utilized in the present invention is the Omega Low Pressure Differential Transducer PX 150/154 series.

The pressure transducers 22, 26, 30 and 34 provide for measuring fluid pressure differential on opposite sides of the conduit, and the use of the three transducers 26, 30 and 34 allow for averaging the fluid pressure near the bend 18 to eliminate the effects of turbulence, noise or other error which might be introduced. Two or more transducers allow for averaging the fluid pressure measurement at that location. Two or more transducers could also be used in place of transducer 22, to average the fluid pressure measured at the inside of the bend 18. Also, multiple measurements by a single transducer, which are then averaged, could be employed in place of using multiple transducers. Finally, placing transducers 26, 30 and 34 in line with each other eliminates the need for calibration of the fluid flow measuring apparatus.

Transducers may be placed in the conduit 10 by tapping the conduit and inserting the preferred pressure transducer or pressure sensing device. The transducers may be held in place by threaded engagement with the conduit, adhesives, or other conventional mechanism. Naturally, maintaining the integrity of the seal between the transducers and the conduit is important to avoid leaking around the transducers or dislodgement thereof. A durable seal can be obtained by a variety of installation techniques. For example, if the transducers and the conduit are threadingly engaged, a teflon tape may be used on the threads to prevent leakage. As another example, a small portion of the conduit could be removed and a portion of conduit, with transducers installed in the walls thereof, could replace the removed portion. As will be appreciated, most techniques for creating a waterproof seal in a pressurized environment will also be applicable to the present invention.

Although pressure transducers are illustrated in the drawing, and these transducers would detect fluid pressure at the location of their installation and develop a signal for transmission to a computer 38 or other calculation device, it should be understood that fluid pressure taps could be used in place of the transducers for communicating fluid from the conduit 10 to a common pressure measuring device.

The precise placement of the pressure transducers may vary somewhat while still maintaining accurate measurements. Caution should be exercised, however, in placing pressure transducers precisely at the outside bend or corner of the conduit 10 since a stagnation area may exist at this point. Particularly, in the event that only pressure transducer 22 and one of pressure transducers 26, 30 and 34 is used, placing one of the latter three precisely at the bend may yield erroneous readings, and rather should be placed within a distance of about one-third of the diameter of the conduit 10, either upstream or downstream.

Signals indicating the pressure detected by pressure transducers 22, 26, 30 and 34 are supplied to the computer 38 for processing and computation of a flow rate. The computer 38 could be the currently available microprocessor such as any eight-bit commercial CPU chip. The flow of fluid through the conduit 10 can be calculated from the signals received from the pressure transducers and from information preprogrammed in the computer representing certain fixed parameters of the conduit 10, according to the formula:

$$m_f = \beta \left( \frac{\pi D^2}{4 \sin \alpha} \right) \sqrt{\rho} \sqrt{\Delta P}$$

where $m_f$ is the mass flow in kilograms per second, $\beta$ is a proportionality constant determined by the pressure profile distribution over the surface of the bend, i.e., it relates the point measurement to the overall pressure profile, and is determined empirically (experimentally) for particular size conduits and angles $\alpha$. D is the diameter of the conduit in meters, $\rho$ is the fluid density in kilograms per cubic meter, α is the angle of the change of direction of the conduit as indicated in the drawing, and ΔP is the pressure difference between pressure transducer 22 and pressure transducers 26, 30 and 34. The values of B, D, ρ (for a single phase fluid or a fluid of invariant density) and α, of course, would be supplied to the computer 38 to enable calculation of the mass flow using the above formula.

Calculation of mass flow by the computer 38 could simply be displayed on a display unit 42 to enable a user to make manual adjustments in the system, if so desired, or the computer 38 could automatically effectuate controls in the system, for example, by opening or closing valves disposed in the conduit 10. In agricultural irrigation systems, monitoring the flow rates could be used to control the amount of water delivered to a field, to shut off the system when delivery was completed or a malfunction occurs, or for various other control functions.

Although the discussion above related to measurement of flow of a single phase fluid such as water in an agricultural irrigation system, it is contemplated that the present invention will have application in other areas. For example, the invention lends itself to the measurement of mixtures and fluids containing impurities such as the flow of a slurry, for example a coal slurry, through a pipe, or multi-phase mixtures such as oil, water, gas and sand. Other examples would include measurement of the flow of municipal waste water and measurement of two-phase flow in a power plant. Clearly, there are a variety of applications of multi-phase fluid flow with which the present invention might be utilized.

If the fluid flowing in the conduit 10 is a multi-phase fluid, then the fluid density would not be known at any given time or any given location in the conduit. In this case, it would be necessary to calculate the density for inclusion in the computation by the computer 38, as indicated in the above formula. Pressure transducers 46 and 50, with the pressure transducer 50 being disposed elevationally above pressure transducer 46 in the conduit 10, may be used to calculate fluid density. The formula for doing this is:

$$\rho = \frac{\Delta P}{gH}$$

where g is the gravitational constant, H is the elevational distance in meters of the pressure transducer 50 above the pressure transducer 46, and ΔP is the pressure difference between pressure transducers 46 and 50.

The pressure transducers for use in calculating fluid density may be located either upstream or downstream of the bend 18 but there needs to be maintained an elevational difference between the two transducers to make the calculation. An alternative pair of pressure transducers 54 and 58 are shown connected by dotted line to the computer 38. Note that the transducer 54 is not positioned diametrically opposite but rather is positioned vertically above the transducer 58. It is not necessary that the uppermost transducer be directly above the lowermost, but only that it be at an elevation above that of the lowermost transducer. Thus, transducer 50 (or transducer 54) could be located in the side of the conduit 10 but still elevationally above transducer 46 (or transducer 58). Also, pressure transducers 22 and 26 might be used for making the density measurement but may not be as accurate due to their proximity to the bend 18.

As depicted in the drawing, the flow measuring system is substantially non-intrusive. The pressure transducers shown project into the conduit 10 only a slight amount to be substantially non-intrusive. Also, there is no requirement that the conduit 10 be contracted or restricted in order to make the flow measurement. Some turbulence in the flow of material in the area of the bend 18 is to be expected, but the reduction in flow associated with most other differential pressure flow measuring devices is significantly eliminated.

The use of the above non-intrusive flow measuring arrangement also has the advantage of reducing or eliminating problems of plugging. Because of the debris oftentimes present in agricultural irrigation systems, the non-intrusive nature of the measuring apparatus becomes very important.

Reducing or eliminating plugging extends the life of the present invention over many prior art systems. As will be appreciated, when a system becomes plugged, it can be severely damaged or even destroyed and so by reducing or eliminating plugging, the possibility of associated damage is reduced or eliminated.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

I claim:

1. A system for measuring fluid mass flow in a conduit having an abrupt bend with a predetermined angle, comprising:

a first pressure sensor means disposed in the side of the conduit at a location at the inside of the bend for measuring pressure of fluid in the conduit at that location, a second or more sensor pressure means disposed on the opposite side of the conduit at a location at the outside of the bend but spaced a distance therefrom, for measuring pressure of fluid in the conduit at that location, and computation means for computing flow rate of fluid in the conduit from the fluid pressure measurements by the first and second pressure sensor means, and from the angle of the bend.

2. A system as in claim 1 wherein said second or more pressure sensor means are located upstream from the bend, of the direction of flow of fluid in the conduit.

3. A system as in claim 1 wherein said second or more pressure sensor means are located downstream from the bend, of the direction of flow of fluid in the conduit.

4. A system as in claim 1 wherein said second or more pressure sensor means are located within a distance of the bend of about one-third of the diameter of the conduit.

5. A system as in claim 1 wherein said first pressure sensor is located upstream from the bend, of the direction of flow of fluid in the conduit.

6. A system as in claim 1 wherein said first pressure sensor is located at the bend.

7. A system as in claim 1 further comprising a third pressure sensor means disposed in a side of the conduit for measuring fluid pressure in the conduit, and a fourth pressure sensor means disposed in the conduit at an elevation above that of the third pressure sensor means, for measuring fluid pressure in the conduit.

8. A system as in claim 7 wherein said computation means includes means for computing the density of fluid flowing in the conduit from the fluid pressure measurements of the third and fourth pressure sensor means, and for computing the flow rate of fluid in the conduit from the fluid pressure measurements of the first and second pressure sensor means and the fluid density calculation.

9. A method for measuring fluid flow in a conduit having an abrupt bend, the method comprising the steps of:
  (a) positioning a first pressure transducer in the side of the conduit at a location inside of the bend, to measure pressure of fluid in the conduit;
  (b) positioning a second or more pressure transducers on the opposite side of the conduit at a location at the outside of the bend, to measure pressure of fluid in the conduit; and
  (c) a computer computing flow rate of fluid in the conduit in accordance with the formula, $$m_f = \beta \left( \frac{D^2 \pi}{4 \sin \alpha} \right) \sqrt{\rho} \sqrt{\Delta P}$$

where $m_f$ is the flow rate in kilograms per second, $\beta$ is a proportionality constant, D is the diameter of the conduit in meters, $\rho$ is the fluid density in kilograms per cubic meter, $\alpha$ is the angle of the change of direction of the conduit at the bend, and $\Delta P$ is the pressure difference between the first pressure transducer and the second or more pressure transducers.

10. A method as in claim 9 wherein step (b) comprises positioning said second or more pressure transducers within a distance of the bend of about ⅓ D or less.

11. A method as in claim 9 further comprising the steps of
  (d) positioning a third pressure transducer in a side of the conduit to measure pressure,
  (e) positioning a fourth pressure transducer in the conduit, at an elevation above that of the third pressure transducer, to measure pressure, and wherein said computing step further comprises
  (f) computing the density $\rho$ of fluid flowing in the conduit in accordance with the formula $$\rho = \frac{\Delta P_2}{gH}$$

where g is the gravitational constant, H is the elevational distance in meters of the fourth pressure transducer above the third pressure transducer, and $\Delta P_2$ is the pressure difference measured between the third pressure transducer and the fourth pressure transducer, and (g) computing the flow rate of fluid in the conduit in accordance with the formula of step (c), using the density $\rho$ computed in step (f).

12. A system for measuring fluid mass flow in a conduit having an abrupt, non-gradual bend formed at a certain angle, comprising
  a first pressure sensor means disposed in the side of the conduit at a location at the inside of the bend for measuring pressure of fluid in the conduit at that location,
  a second or more pressure sensor means disposed on the opposite side of the conduit at a location at the outside of the bend but spaced a distance therefrom, for measuring pressure of fluid in the conduit at that location, and
  computation means for computing flow rate of fluid in the conduit from the fluid pressure measurements by the first and second pressure sensor means.

* * * * *